Oct. 14, 1952     T. W. TURNER     2,614,047
FROZEN CONFECTION ON A STICK
Filed Aug. 10, 1950
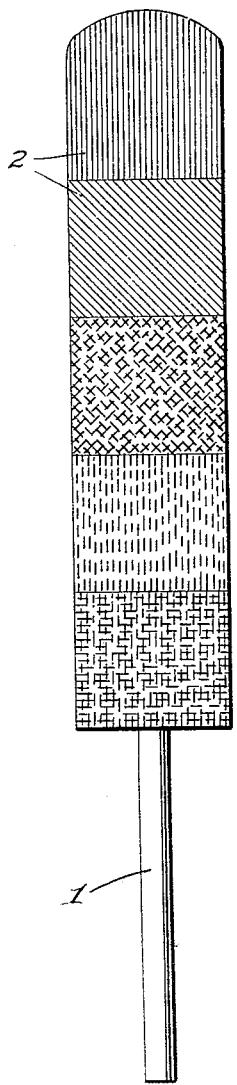
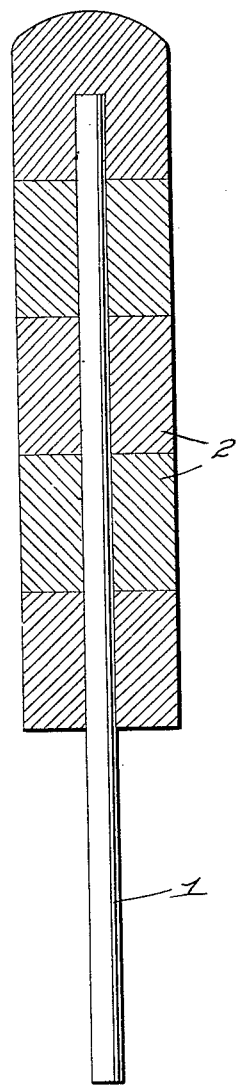
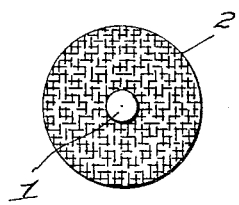
INVENTOR.
Thomas W. Turner
BY
Wilfred E. Lawson
ATTORNEY Patented Oct. 14, 1952

2,614,047

UNITED STATES PATENT OFFICE 2,614,047

FROZEN CONFECTION ON A STICK

Thomas W. Turner, Newport News, Va.

Application August 10, 1950, Serial No. 178,667

2 Claims. (Cl. 99—137)

This invention relates to a frozen confection and it is an object of the invention to provide an article of this kind consisting of a series of sections of different flavors and/or colors.

It is also an object of the invention to provide an article of this kind comprising a plurality of sections of different flavors and/or colors and wherein adjacent sections are of such mixtures to eliminate the mix of one section mixing into the mix of an adjacent section.

The invention consists in the details of construction and in the combination and arrangement of the several parts of my improved sucker on a stick whereby certain advantages are attained, as will be hereinafter more fully set forth.

In order that my invention may be better understood, I will now proceed to describe the same with reference to the accompanying drawings, wherein:

Figure 1 is an elevational view of a confection embodying the invention;

Figure 2 is a longitudinal sectional view through Figure 1 with the stick in elevation; and Figure 3 is a view in bottom plan of Figure 1.

In the embodiment of the invention as illustrated in the accompanying drawings, 1 denotes a stick of the desired length and of wood or such other material as may be desired.

Molded or otherwise formed on the stick 1 are a plurality of confection sections 2 of candy or the like and which are herein disclosed as five in number. Each section 2 is herein disclosed as substantially cylindrical in form and all of the sections 2 are preferably of the same dimensions although the invention is not to be limited in this respect.

Each of the sections is a conventional mix and of a desired flavor but further includes a syrup in its mixture. The weight of the syrup in each section 2 differs from the weight of each of the remaining sections. In applying the sections 2 to the stick 1, the section having the greatest weight of syrup being at one end, preferably the inner end of the sections 2. The weight of the syrup in the adjacent section is successively decreased or lessened. By this variable use of the syrup, the mix of one section 2 will not run into the mix of an adjacent section or sections.

The syrup is of any edible character desired, such as cane syrup, and, in the mixing of the materials for the various sections 2, the amount of syrup for the mix of the heaviest section 2 is approximately eight pounds to one gallon of the regular mix. The weight of the syrup decreases about two pounds for each successive section 2 except the outermost section 2 wherein the mix may be free of the syrup.

It is also of advantage to have the sections 2 of different flavors such as lemon, grape, orange, lime and strawberry as this will result in the various sections 2 being of different colors and thereby materially increase the attractiveness of the confection particularly from a selling viewpoint.

While it has been herein before stated that the maximum amount of syrup to a gallon is eight pounds, the invention is not confined to proportions as obviously the weight of the syrup will be determined by the number of sections 2 and, of course, the character of the various mixes. It is only necessary that there be a decided difference in the weight of syrup in adjacent sections 2 to eliminate the running of the mix of one section 2 into the adjacent sections.

From the foregoing it is thought to be obvious that a sucker on a stick constructed in accordance with my invention is particularly well adapted for use by reason of the convenience and facility with which it may be assembled and operated.

I claim:

1. A frozen confection comprising a stick, a plurality of sections of frozen normally liquid materials on the stick, the mix of each of the sections including a syrup to prevent the running of the mix of one section into the mix of an adjacent section, the weight of the syrup in the mix of one section being different from the weight of the syrup in an adjacent section.

2. A frozen confection comprising a stick, a plurality of sections of frozen normally liquid materials on the stick, the mix of each of the sections including a syrup to prevent the running of the mix of one section into the mix of an adjacent section, the weight of the syrup in the sections successively decreasing, from one of the end sections on the stick.

THOMAS W. TURNER.

REFERENCES CITED

The following references are of record in the file of this patent:

UNITED STATES PATENTS

| Number | Name | Date |
|---|---|---|
| 1,214,168 | Johnson et al. | Jan. 30, 1917 |
| 1,968,183 | Vogt | July 31, 1934 |
| 2,036,706 | Law | Apr. 7, 1936 |